June 29, 1965  L. S. LINDEROTH, JR  3,191,233
FLOW CONTROL APPARATUS
Filed Nov. 30, 1962  2 Sheets-Sheet 1

INVENTOR
LAMBERT S. LINDEROTH, JR.

BY Mason, Porter, Diller & Stewart

ATTORNEYS

June 29, 1965　　　L. S. LINDEROTH, JR　　　3,191,233
FLOW CONTROL APPARATUS
Filed Nov. 30, 1962　　　　　　　　　　　　　　　　2 Sheets-Sheet 2

INVENTOR
LAMBERT S. LINDEROTH, JR.
BY Mason, Porter, Diller & Stewart
ATTORNEYS

3,191,233
FLOW CONTROL APPARATUS
Lambert S. Linderoth, Jr., Battle Creek, Mich., assignor to Continental Can Company, Inc., New York, N.Y., a corporation of New York
Filed Nov. 30, 1962, Ser. No. 241,386
17 Claims. (Cl. 18—30)

This invention relates in general to new and useful improvements in injection molding apparatus, and more particularly relates to a novel flow control apparatus for controlling the flow of plastic from a conventional extruder into a conventional injection cylinder.

This invention particularly relates to an injection molding apparatus wherein a preplasticizing plastic extruder is provided for supplying plastic to an injection cylinder which is then utilized to inject the plastic into a mold through an injection nozzle associated with the injection cylinder and momentarily sealed with respect to the mold. The extruder is provided with a hopper for receiving plastic pellets and has a feed screw for propelling the plastic therethrough. A three-way valve is provided for selectively communicating the extruder with the injection cylinder to feed plastic into the injection cylinder and communicating the injection cylinder with the injection nozzle for the delivery of plastic from the injection cylinder through the injection nozzle. When the injection cylinder is to be filled with plastic from the extruder, it is desirable that the feed screw of the extruder operate at a maximum optimum speed so as to quickly fill the injection cylinder. On the other hand, after the injection cylinder has been filled, it is desirable to further control the driving of the feed screw so that the feed screw is either stopped or driven at a very low speed as compared to the plastic feeding speed thereof.

The primary object of this invention is to provide a flow control apparatus for use in automatically controlling the speed of drive of the feed screw of the extruder and which flow control apparatus includes a variable speed drive for the feed screw, which variable speed drive is electrically controllable by means of an electric circuit which includes a control switch operated in accordance with the position of the three-way valve which selectively communicates an injection cylinder with an extruder and an injection nozzle.

Another object of this invention is to provide a flow control apparatus for controlling the speed of a feed screw of an extruder in accordance with the operation of the remainder of an injection molding apparatus of which the extruder is a part wherein the speed of the feed screw will be controlled in accordance with the condition of feeding plastic to the injection cylinder or the delivering of plastic from the injection cylinder through an associated injection nozzle, the flow control apparatus including an electrically controlled variable speed drive to which there is connected an electrical circuit, and the electrical circuit being controlled both by the position of a control valve for determining the flow of plastic either into the injection cylinder from the extruder or from injection cylinder through the injection nozzle, and a pressure operated switch mounted intermediate the extruder and the valve wherein undesired operation of the feed screw causing abnormal pressure build up is eliminated.

Another object of this invention is to provide a novel flow control apparatus for controlling the operation of a feed screw of an extruder in the supplying of plastic from the extruder into an injection cylinder operated by a pressure cylinder and wherein the flow of plastic into and out of the injection cylinder is controlled by a valve, the flow control apparatus including a variable speed drive for the feed screw of the extruder with the variable speed drive being of an electrically controlled type, there being an electrical circuit associated with the variable speed drive, and the electrical circuit including a control switch controlled by the position of the valve and a time delay switch controlled by the position of the piston of the pressure cylinder wherein opening of the circuit to the control for the variable speed drive a predetermined time after the piston reaches a predetermined position, is assured.

A further object of this invention is to provide an electrical control circuit which is part of a flow control apparatus for controlling the delivering of plastic from an extruder to an injection cylinder operated by a pressure cylinder, the control circuit operating a variable speed drive for the feed screw of the extruder and including a control switch operated by the position of a valve disposed intermediate the extruder and the injection cylinder, and a time delay switch which is actuated as the piston of the pressure cylinder approaches its fully retracted position wherein the speed of the feed screw of the extruder is greatly reduced in timed sequence to the piston reaching its fully retracted position so as to normally prevent excess pressure build up within the apparatus.

Still another object of this invention is to provide a novel electrical system which is part of a flow control apparatus for controlling the feeding of plastic from the extruder into an injection cylinder operated by a pressure cylinder and wherein the flow of plastic is controlled by a valve, the electrical system operating a variable speed drive for a feed screw of the extruder and including a control switch actuated by the position of the valve, and a time delay switch which has the operation thereof commenced as a piston of the pressure cylinder starts moving from a fully projected position to a fully retracted position with the timing of the switch being controlled to normally control the operation of the variable speed drive at the end of a predetermined time period which is in accordance with the time required for the filling of the injection cylinder.

With the above and other objects in view that will hereinafter appear, the nature of the invention will be more clearly understood by reference to the following detailed description, the appended claims and the several views illustrated in the accompanying drawings.

Figure 1:
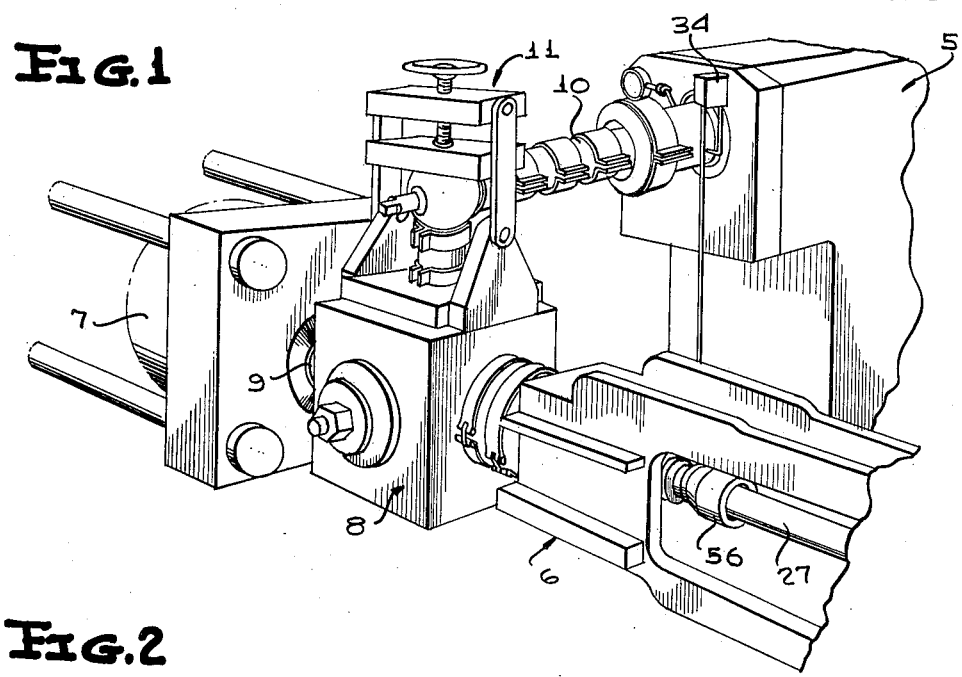
FIGURE 1 is a perspective view showing the general relationship of an extruder, an injection cylinder, a control valve and an injection mold, and shows the general environment of the flow control apparatus of this invention.

Referring now to the drawings in detail, reference is first made to FIGURE 1 wherein there is shown the general relationship of an extruder 5, an injection cylinder 6 and a retractable sprue bushing 7 of an injection mold. An injunction molding machine transfer valve 8 which will hereinafter be called a control valve, is disposed intermediate the extruder 5 and the injection cylinder 6 and intermediate the injection cylinder 6 and an injection nozzle 9 which cooperates with the sprue bushing 7. The extruder 5 is provided with a discharge pipe 10 which is releasably coupled to the control valve 8 by a clamping and quick disconnect unit 11.

This invention has to do with a flow control apparatus for controlling the operation of the extruder 5 in relation to the feeding of plastic to the injection cylinder 6 and the discharge of the plastic from the injection cylinder 6.

Figure 2:
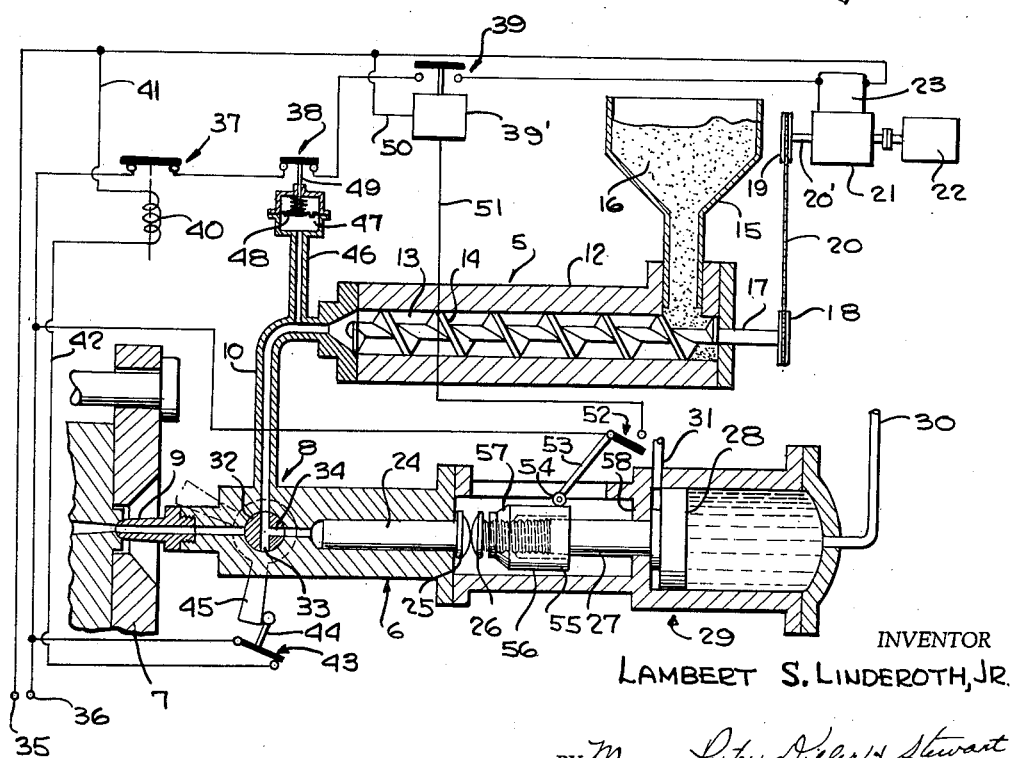
FIGURE 2 is a schematic view showing the general relationship of the extruder, the injection cylinder, control valve and injection nozzle together with the flow control apparatus.

Referring now to FIGURE 2, it will be seen that the working components of the extruder 5 are schematically illustrated as including an extruder cylinder or barrel 12 having an elongated bore 13 therethrough. A feed screw 14 is disposed within the bore for the purpose of feeding plastic therethrough. At the right hand end of the barrel 12 there is a hopper 15 for supplying plastic pellets 16 into the right hand end of the bore 13 for movement through the bore 13 from right to left by the feed screw 14. The plastic is delivered from the housing 12 by the feed screw 14 into the plastic supply pipe 10.

The feed screw 14 is provided with a drive shaft 17 which is schematically illustrated as having a drive sprocket 18 secured thereto. The drive sprocket 18 is driven from a sprocket 19 by means of a drive chain 20. The sprocket 19 is carried by an output shaft 20' of a variable speed drive unit 21 which is coupled to and driven from an electric motor 22. The variable speed drive unit 21 has an electrical control device 23. It is to be understood that the electric motor 22, the electrical control 23 and the variable speed drive unit 21 are all conventional and need not be described in more detail hereinafter, with the exception of the statement that the control unit 23, in accordance with this invention, has two settings. The first of these settings is a constant speed output for the variable speed drive unit which is that desired for the optimum operation of the feed screw 14 during the supplying of plastic to the injection cylinder 6. The other setting of the control unit 23 is either a stop position or a constant speed low speed position.

The injection cylinder 6 includes a plunger or piston 24 which extends through the right end of the cylinder 6 and is provided at the right end thereof with an abutment member 25. The abutment member opposes a second abutment head 26 carried by a piston rod 27 of a piston 28 which is part of a conventional pressure cylinder unit, generally referred to by the numeral 29. The pressure cylinder unit 29 serves to force the piston 24 to the left so as to forcibly eject plastic from the cylinder 6 and through the injection nozzle 9 under pressure during an injection molding operation. The pressure cylinder unit 29 is of the double acting type and is provided with fluid lines 30 and 31 through which fluid under pressure is introduced into the cylinder of the pressure cylinder unit 29.

The control valve 8 includes a valve member 32 having a first passage 33 extending diametrically therethrough and a second radial passage 34 which is disposed at right angles to and intersects the passage 33. It will be readily apparent that the valve member 32 has two positions. In the position illustrated, plastic fed from the extruder 5 into the valve 8 passes first into the passage 33 and then into the passage 34 from which it passes into the injection cylinder 6. The plastic being fed into the injection cylinder 6 acts against the left end of the piston 24 and moves the piston 24 to the right until the injection cylinder 6 has been filled with the desired quantity of plastic. The valve member 32 may then be rotated in a clockwise direction from that shown in FIGURE 2 to a position wherein the passage 33 places the injection nozzle 9 in communication with the injection cylinder 6. Then, by actuating the pressure cylinder unit 29, the piston 24 may be moved to the left to force plastic from the injection cylinder 6 under high pressure, through the valve 8, and out through the injection nozzle 9.

The control valve 8 and the electrical control unit 23 for the variable speed drive unit 21 form part of a flow control apparatus which is the subject of this invention. The flow control apparatus also includes an electrical system for controlling the operation of the electrical control unit 23.

The electrical system includes a pair of power lines 35, 36 of which the power line 35 is directly connected to the electrical control unit 23. The power line 36 is also connected to the electrical control unit 23, but is interrupted by a plurality of switches arranged in series. These switches include a normally open solenoid actuated circuit controlling switch 37, a normally closed pressure actuated switch 38 and a time delay switch 39.

Considering first the circuit controlling switch 37, it will be seen that it includes a solenoid coil 40 which is connected by a wire 41 to the power line 35 and by a wire 42 to the power line 36. A normally open control switch 43 is disposed intermediate the ends of the wire 42 and controls the energization of the coil 40. The control switch 43 includes an operating arm 44 which is positioned for engagement by an arm 45 coupled to the valve member 32 wherein the switch 43 is closed when the valve member 32 is in a position for feeding plastic to the injection cylinder 6 from the extruder 5.

The pressure operated switch 38 is coupled to the plastic feed line 10 extending between the extruder 5 and the control valve 8 by a pipe 46 for receiving plastic under pressure. Pipe 46 leads into a housing 47 in which there is disposed a spring loaded diaphragm 48 which, in turn, is coupled to a control rod 49 of the switch 38. It will be readily apparent that although the switch 38 is normally closed, when there is an excess pressure built up within the housing 47, the reaction of this pressure on the diaphragm 48 will result in the opening of the switch 38 to open the circuit to the electrical control unit 23.

The operating mechanism 39' of the time delay switch 39 is connected to the power line 35 by means of a wire 50 and to the power line 36 by means of a wire 51. The wire 51 has coupled therein a switch 52 which is provided with an operating arm 53 having a cam follower 54. The cam follower 54 normally rides on a cam surface 55 of a collar 56 adjustably threaded on the piston rod 27 for movement therewith. Except when the piston 28 of the pressure cylinder 29 is fully retracted, the cam follower 54 rides on the cam surface 55 and retains the switch 52 in an open position. However, when the piston 28 is moved to the right prior to the filling of the injection cylinder 6, the cam surface 55 moves beneath the cam follower 54 until the piston 28 is almost fully retracted at which time the cam follower 54 rides down a ramp 57 at the left end of the cam surface 55 and permits the switch 52 to close to close the switch 39 and to start the running of the timing mechanism 39' of the time delay switch 39. After a predetermined time interval passes, the normally open switch 39 again opens to open the circuit to the electrically controlled unit 23. The position of the collar 56 along the piston rod 27 determines the maximum amount of plastic that can be accepted by the injection cylinder 6 during the filling thereof as will be apparent from the following explanation of the operation.

*Operation*

Assuming the piston 24 of the injection cylinder 6 to be in its fully projected left hand position of FIGURE 2, it is necessary that the injection cylinder 6 be refilled with plastic before further injection molding operations can take place. In order to accomplish the refilling of the injection cylinder 6, the valve 8 is manipulated in a manner wherein the valve member 32 is rotated to assume the position shown in FIGURE 2. When the valve member 32 reaches the position shown, the arm 45 coupled to the valve member 32 serves to swing the switch 43 to a circuit completing position thus energizing the coil 40 of the solenoid operated switch 37. The switch 37 then completes the circuit across its portion of the power line 36. The switch 38 is normally closed, while the switch 37 is normally open. Fluid is then supplied to the pressure cylinder 29 through the fluid line 31 to move the piston 28 to the right in FIGURE 2. As the piston 28 moves to the right, the cam follower 54 rides down the ramp 57 to close the switch 52 and thus close the time delay switch 39 and begin the operation of the time mechanism thereof. Movement of the piston 28 to the right is limited by engagement of the collar 56 with a stop shoulder 58 of the pressure cylinder 29 thus limiting the amount of plastic that can be accepted by the injection cylinder 6.

The timing mechanism 39′ of the time delay switch 39 should be set to run for a period of time normally required for the screw 14 to feed a sufficient amount of plastic to the extrusion cylinder 6 without overloading the cylinder 6 and causing a back pressure buildup to operate the pressure switch 38. Once the time delay switch 39 has been operated, it will not again operate until the switch 52 has been opened and again closed. When the time delay switch 39 opens, the electrical control unit 23 will again vary the speed of the variable speed drive unit 21 so as to discontinue the feeding of the plastic to the injection cylinder 6. The variation in speed of the variable speed drive unit may be either the stopping of the driving of the feed screw 14 or the driving thereof at a very low speed.

During the normal operation of the flow control apparatus, the pressure operated switch 38 remains closed. However, if for any reason there is a build up of excessive pressure of the plastic within the plastic supply line 10, the excessive pressure will result in the opening of the pressure operated switch 38 so as to immediately stop the rotation of the feed screw 14 or to slow down the speed of rotation of the feed screw 14 in accordance with the particular setting of the electrical control unit 23.

The extrusion operation is again initiated by rotating the valve member 32 to the dotted line position of FIGURE 2, after which fluid is admitted to the pressure cylinder 29 through the fluid line 30 to move the piston 28 to the left to a position exerting a force on the piston 24.

Figure 3:
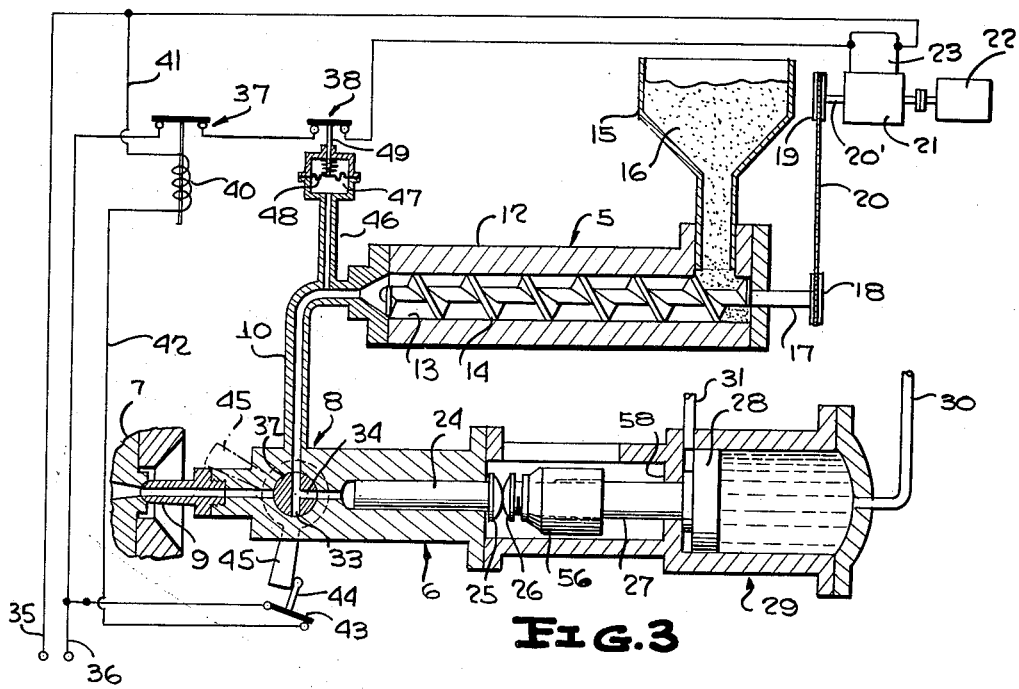
FIGURE 3 is a schematic view similar to FIGURE 2 and shows a slightly modified form of flow control apparatus.

Reference is now made to FIGURE 3 of the drawings wherein the extruder 5, the injection cylinder 6 and the valve 8 are provided with a modified form of flow control apparatus. The flow control apparatus illustrated in FIGURE 3 is identical with the flow control apparatus of FIGURE 2 with the exception of the fact that the time delay switch 39 and its associated electrical components have been omitted. These components include the wires 50 and 51, the switch 52 and the cam follower mechanism for effecting the actuation of the switch 52. In the flow control apparatus of FIGURE 3, the pressure operated switch 38 functions as the shut-off switch whereas in the flow control apparatus of FIGURE 2, the time delay switch 39 operated as the shut-off switch and the pressure operated switch 38 was for safety purposes only.

*Operation*

The flow control apparatus of FIGURE 3 will be more fully understood by reference to the operation thereof. Assuming the piston 24 of the injection cylinder 6 to be in its fully leftwardly extended position shown, and it being desired to again fill the injection cylinder 6 with plastic from the extruder 5, fluid is directed into the pressure cylinder 29 through the fluid line 31 to retract the piston 28 to the right. Then the valve 8 is rotated so that the valve member 32 thereof assumes the position shown in FIGURE 3. This places the injection cylinder 6 in communication with the extruder 5 for receiving plastic therefrom. When the valve member 32 is rotated, the arm 45 connected thereto moves the normally open switch 43 to a closed position with the result that the coil 40 of the solenoid operated switch 37 is energized to move the switch to its closed position from its normally open position. The pressure operated switch 38 being normally closed, the circuit to the electrical control unit 23 is completed and the variable speed drive unit is adjusted to provide for the predetermined constant high speed rotation of the feed screw 14. The feed screw 14 feeds plastic from the extruder 5 into the injection cylinder 6 and urges the piston 24 to the right. Plastic is continued to be fed into the injection cylinder 6 until the abutment member 25 engages the abutment member 26 which is prevented from moving further to the right by the engagement of the collar 56 with the stop shoulder 58 of the pressure cylinder unit 29 so as to prevent further movement of the piston 24 to the right. When further movement of the piston 24 is prevented, there is a pressure build up within the plastic supply line 10 and this resultant pressure build up reacts on the diaphragm 48 to open the pressure operated switch 38 to thus open the circuit to electrical control unit 23. The electrical control unit 23 serves to adjust the drive of the variable speed drive unit 21 to either a relatively slow constant speed or to stop the driving of the feed screw 14.

Figure 4:
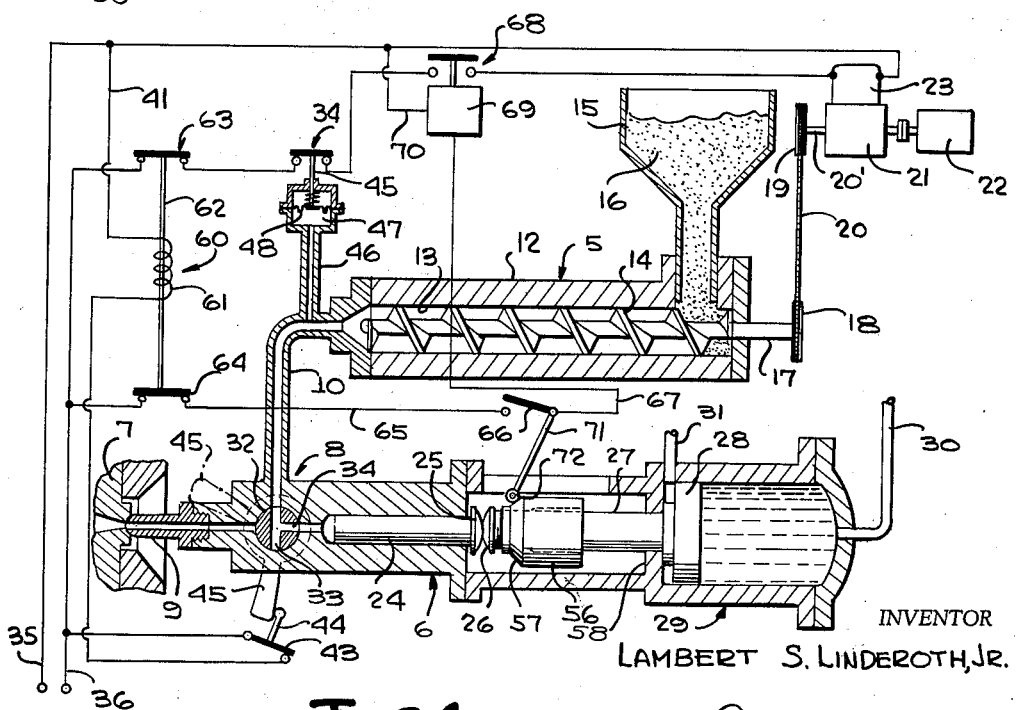
FIGURE 4 is another schematic view similar to FIGURE 2 and shows still another modified form of flow control apparatus.

Reference is now made to FIGURE 4 of the drawings wherein there is illustrated still another form of flow control apparatus used in conjunction with the extruder 5, the injection cylinder 6 and the control valve 8. The flow control apparatus of FIGURE 4 incorporates many of the features of the flow control apparatus of FIGURE 2. However, the solenoid control switch 37 has been replaced by a multiple unit solenoid control switch 60 which includes a coil 61 and an operator 62 movable by the coil 61. The multiple unit solenoid controlled switch 60 includes a first switch unit 63 and a second switch unit 64 both of which are normally open and are operated in unison. The switch unit 63 is disposed within the power line 36. The switch unit 64 is mounted within a wire 65 which connects line 36 to a normally closed switch 66. The switch 66 has a wire 67 connected thereto which leads to a time delay switch 68 which has replaced the time delay switch 39. The time delay switch 68 is normally open and is mounted in the power line 36 in series with the switches 34 and 63. The control unit of the time delay switch 68 is referred to by the numeral 69 and has connected thereto a second wire 70 which leads to the power line 35. Thus, the time delay switch 68 is controlled by the switches 64 and 66.

The normally closed switch 66 is provided with an arm 71 which carries a cam follower 72. The cam follower 72 is engaged by the ramp 57 of the collar 56 to open the switch 66.

*Operation*

In the operation of the flow control apparatus illustrated in FIGURE 4, when it is desired to refill the injection cylinder 6, the valve 8 is operated so as to turn the valve member 28 to the position shown. This places the extruder 5 in communication with the injection cylinder 6 for delivering plastic thereto. The movement of the valve member 32 to the position shown in FIGURE 4 results in the closing of the switch 43 which energizes the coil 61 to cause operation of the switch 60. This results in the closing of the switch units 63 and 64. The time delay switch 68 being open, there is no immediate change in the operation of the feed screw 14. Fluid is then supplied to the pressure cylinder 29 through the fluid line 31 to move the piston 28 to the right and to withdraw the collar 56 from beneath the cam follower 72. This results in the returning of the switch 66 to its normally closed position and the resultant closing of the time delay switch 68 and the operation of the control unit 69 thereof. The closing of the time delay switch 68 results in the energization of the electrical control device 23 to change the speed of the variable speed drive unit 21 in a manner wherein the feed screw 14 is driven at a constant desired speed for feeding plastic from the extruder 5 into the injection cylinder 6.

The time delay mechanism of the time delay switch 68 is conventional and is set to operate for a time which corresponds to the time normally required to fill the injection cylinder 6 with plastic due to the operation of the feed screw 14. The piston 24 moves to its retracted position and movement thereof is normally discontinued by the operation of the time delay switch 68.

Under normal operating conditions of the flow control apparatus of FIGURE 4, the pressure operated switch 34 does not operate. However, if for some reason the timing of the time delay switch 68 is set too long or there is a hang-up of the piston 24, a pressure build up in the pressure supply line 10 will result in the operation of the pressure operated switch 34 and the opening of the circuit to the electrical control unit 23.

When the circuit to the electrical control unit 23 is opened either by operation of the switch 34 or operation of the switch 68, the speed of the variable speed drive unit 21 is again changed so as to be either stopped or slowed down from the previous driving speed. In this manner, further pressure build up within the plastic supply line 10 is prevented.

It is to be understood that when the time delay switch 68 opens, it will not be immediately re-energized due to the fact that the switch 66 is still closed. The control unit 69 requires that the switch 66 be opened and then reclosed before the time delay switch 68 is again actuated.

After the injection cylinder 6 is again filled with plastic, fluid is introduced into the pressure cylinder 29 through the fluid line 30 to move the piston 28 to the left. This movement of the piston 28 results in the application of pressure on the piston 24 urging the piston 24 to the left to inject the plastic material as desired.

From the foregoing, it will be seen that there has been provided a simple, yet practical, pressure control apparatus for automatically controlling the operation of the feed screw of an extruder during the feeding of plastic from the extruder to an injection cylinder and the automatic slowing down or stopping of the feed screw when sufficient plastic has been fed to the injection cylinder.

Although several preferred embodiments of the invention have been illustrated and described herein, it is to be understood that the invention is not restricted to the exact embodiments illustrated and described in that minor modifications may be made in the flow control apparatus within the spirit and scope of the invention, as defined in the appended claims.

I claim:

1. A flow control apparatus in combination with an injection molding apparatus of the type including an extruder having a driven feed member, an injection cylinder and an injection nozzle, said flow control apparatus comprising an electrically controlled variable speed drive unit connected to said feed member, a conduit means including a multiple position valve disposed between said extruder, said injection cylinder and said injection nozzle for selectively communicating said extruder with said injection cylinder to supply plastic thereto and said injection cylinder to said injection nozzle to deliver plastic from said injection cylinder through said injection nozzle, and an electrical system connected to said electrically controlled variable speed drive unit for controlling the operation of the same and varying the speed thereof, said electrical system including a drive unit control switch operatively connected to said valve and actuated in accordance with the position of said valve.

2. The flow control apparatus of claim 1 wherein said variable speed drive unit has two speeds including a constant high speed for driving said feed member during the delivery of plastic to said injection cylinder and a constant low speed for driving said feed member during the time when communication between said extruder and said injection cylinder is closed.

3. The flow control apparatus of claim 1 wherein said variable speed drive unit has two positions, a constant high speed position for driving said feed member during the delivery of plastic to said injection cylinder and a stop position for discontinuing the operation of said feed member during the time when communication between said extruder and said cylinder is closed.

4. A flow control apparatus in combination with an injection molding apparatus of the type including an extruder having a driven feed member, an injection cylinder and an injection nozzle, said flow control apparatus comprising an electrically controlled variable speed drive unit connected to said feed member, a conduit means including a multiple position valve disposed between said extruder, said injection cylinder and said injection nozzle for selectively communicating said extruder with said injection cylinder to supply plastic thereto and said injection cylinder to said injection nozzle to deliver plastic from said injection cylinder through said injection nozzle, and an electrical system connected to said electrically controlled variable speed drive unit for controlling the operation of the same and varying the speed thereof, said electrical system including a drive unit control switch operatively connected to said valve and actuated in accordance with the position of said valve, and a normally closed circuit controlling pressure switch coupled intermediate said extruder and said valve for opening said electrical system in response to an excessive pressure within said pressure switch.

5. A flow control apparatus in combination with an injection molding apparatus of the type including an extruder having a driven feed member, an injection cylinder and an injection nozzle, said flow control apparatus comprising an electrically controlled variable speed drive unit connected to said feed member, a conduit means including a multiple position valve disposed between said extruder, said injection cylinder and said injection nozzle for selectively communicating said extruder with said injection cylinder to supply plastic thereto and said injection cylinder to said injection nozzle to deliver plastic from said injection cylinder through said injection nozzle, and an electrical system connected to said electrically controlled variable speed drive unit for controlling the operation of the same and varying the speed thereof, said electrical system including a drive unit control switch operatively connected to said valve and actuated in accordance with the position of said valve, and a normally open solenoid operated circuit controlling switch connected to and operated by said control switch.

6. A flow control apparatus in combination with an injection molding apparatus of the type including an extruder having a driven feed member, an injection cylinder and an injection nozzle, said flow control apparatus comprising an electrically controlled variable speed drive unit connected to said feed member, a conduit means including a multiple position valve disposed between said extruder, said injection cylinder and said injection nozzle for selectively communicating said extruder with said injection cylinder to supply plastic thereto and said injection cylinder to said injection nozzle to deliver plastic from said injection cylinder through said injection nozzle, and an electrical system connected to said electrically controlled variable speed drive unit for controlling the operation of the same and varying the speed thereof, said electrical system including a drive unit control switch operatively connected to said valve and actuated in accordance with the position of said valve, a normally open solenoid operated circuit controlling switch connected to and operated by said control switch, and a normally closed circuit controlling pressure switch coupled intermediate said extruder and said valve for opening said electrical system in response to an excessive pressure within said pressure switch.

7. A flow control apparatus in combination with an injection molding apparatus of the type including an extruder having a driven feed member, an injection cylinder and an injection nozzle, said flow control apparatus comprising an electrically controlled variable speed drive unit connected to said feed member, a conduit means including a multiple position valve disposed between said extruder, said injection cylinder and said injection nozzle for selectively communicating said extruder with said injection cylinder to supply plastic thereto and said injection cylinder to said injection nozzle to deliver plastic from said injection cylinder through said injection nozzle, and an electrical system connected to said electrically controlled variable speed drive unit for controlling the operation of the same and varying the speed thereof, said electrical system including a drive unit control switch operatively connected to said valve and actuated in accordance with the position of said valve, said injection cylinder having drive means, and said electrical system including a circuit controlling time delay switch operable in accordance with the position of said drive means.

8. The flow control apparatus of claim 7 wherein said time delay switch has a control circuit including a drive means actuated switch.

9. The flow control apparatus of claim 7 wherein said time delay switch has a control circuit including a drive means actuated switch and a cam carried by said drive means controlling operation of the drive means actuated switch.

10. The flow control apparatus of claim 7 wherein said time delay switch has a control circuit including a drive means actuated switch and a cam carried by said drive means controlling operation of the drive means actuated switch, said cam normally holding said drive means actuated switch open and the relative positions of said drive means actuated switch and said cam being arranged to provide for the closing of said drive means actuated switch and the operation of said time delay switch upon the movement of said drive means from a fully projected position.

11. The flow control apparatus of claim 7 wherein said time delay switch has a control circuit including a drive means actuated switch and a cam carried by said drive means controlling operation of the drive means actuated switch, said drive means actuated switch being normally closed, said drive means actuated switch and said cam being relatively positioned whereby said drive means actuated switch will be opened only when said drive means is in a fully projected position, and said time delay switch being set to have a time delay period substantially equal to the time required to fill said injection cylinder.

12. The flow control apparatus of claim 11 together with a multiple solenoid operated switch connected to and operated by said control switch, said multiple switch including a normally open main circuit controlling switch unit and a normally open switch unit connected in said control circuit.

13. A flow control apparatus in combination with an injection molding apparatus of the type including an extruder having a driven feed member, an injection cylinder and an injection nozzle, said flow control apparatus comprising an electrically controlled variable speed drive unit connected to said feed member, a conduit means including a multiple position valve disposed between said extruder, said injection cylinder and said injection nozzle for selectively communicating said extruder with said injection cylinder to supply plastic thereto and said injection cylinder to said injection nozzle to deliver plastic from said injection cylinder through said injection nozzle, and an electrical system connected to said electrically controlled variable speed drive unit for controlling the operation of the same and varying the speed thereof, said electrical system including a drive unit control switch operatively connected to said valve and actuated in accordance with the position of said valve, said injection cylinder having drive means, and said electrical system including a circuit controlling time delay switch operable in accordance with the position of said drive means, and a normally open solenoid operated circuit controlling switch connected to and operated by said control switch.

14. A flow control apparatus in combination with an injection molding apparatus of the type including an extruder having a driven feed member, an injection cylinder and an injection nozzle, said flow control apparatus comprising an electrically controlled variable speed drive unit connected to said feed member, a conduit means including a multiple position valve disposed between said extruder, said injection cylinder and said injection nozzle for selectively communicating said extruder with said injection cylinder to supply plastic thereto and said injection cylinder to said injection nozzle to deliver plastic from said injection cylinder through said injection nozzle, and an electrical system connected to said electrically controlled variable speed drive unit for controlling the operation of the same and varying the speed thereof, said electrical system including a drive unit control switch operatively connected to said valve and actuated in accordance with the position of said valve, said injection cylinder having drive means, and said electrical system including a circuit controlling time delay switch operable in accordance with the position of said drive means and a normally closed circuit controlling pressure switch coupled intermediate said extruder and said valve for opening said electrical system in response to an excessive pressure within said pressure switch.

15. The flow control apparatus of claim 7 wherein said time delay switch has a control circuit including a drive means actuated switch and a cam carried by said drive means controlling operation of the drive means actuated switch, said cam normally holding said drive means actuated switch open and the relative positions of said drive means actuated switch and said cam being arranged to provide for the closing of said drive means actuated switch and the operation of said time delay switch upon the movement of said drive means from a fully projected position, and a normally closed circuit controlling pressure switch coupled intermediate said extruder and said valve for opening said electrical system in response to an excessive pressure within said pressure switch.

16. The flow control apparatus of claim 7 wherein said time delay switch has a control circuit including a drive means actuated switch and a cam carried by said drive means controlling operation of the drive means actuated switch, said drive means actuated switch being normally closed, said drive means actuated switch and said cam being relatively positioned to open said drive means actuated switch only when said drive means is in a fully projected position, and said time delay switch being set to have a time delay period substantially equal to the time required to fill said injection cylinder, and a normally closed circuit controlling pressure switch coupled intermediate said extruder and said valve for opening said electrical system in response to an excessive pressure within said pressure switch.

17. A flow control apparatus in combination with an injection molding apparatus of the type including an extruder having a driven feed member, an injection cylinder and an injection nozzle, said flow control apparatus comprising an electrically controlled variable speed drive unit connected to said feed member, a conduit means including a multiple position valve disposed between said extruder, said injection cylinder and said injection nozzle for selectively communicating said extruder with said injection cylinder to supply plastic thereto and said injection cylinder to said injection nozzle to deliver plastic from said injection cylinder through said injection nozzle, and an electrical system connected to said electrically controlled variable speed drive unit for controlling the operation of the same and varying the speed thereof, said electrical system including a drive unit control switch operatively connected to said valve and actuated in accordance with the position of said valve, said injection cylinder having drive means, and said electrical system including a circuit controlling time delay switch operable in accordance with the position of said drive means, and a normally open solenoid operated circuit controlling switch connected to and operated by said control switch, and a normally closed circuit controlling pressure switch coupled intermediate said extruder and said valve for opening said electrical system in response to an excessive pressure within said pressure switch.

References Cited by the Examiner

UNITED STATES PATENTS

| | | | |
|---|---|---|---|
| 2,747,222 | 5/56 | Koch et al. | 18—21 |
| 2,804,648 | 9/57 | Strauss | 18—30 |
| 2,881,477 | 4/59 | Triulzi | 18—30 |

FOREIGN PATENTS

| | | |
|---|---|---|
| 1,195,860 | 5/59 | France. |

MICHAEL V. BRINDISI, *Primary Examiner.*

ROBERT F. WHITE, *Examiner.*